United States Patent

Tagashira et al.

[11] Patent Number: 5,926,597
[45] Date of Patent: Jul. 20, 1999

[54] CONNECTOR FOR OPTICAL FIBER

[75] Inventors: Ryuichi Tagashira, Tokyo; Hiroshi Higashida, Kanagawa, both of Japan

[73] Assignee: Kel Corporation, Tokyo, Japan

[21] Appl. No.: 08/862,347

[22] Filed: May 23, 1997

[30] Foreign Application Priority Data

May 28, 1996 [JP] Japan ..................... 8-133826

[51] Int. Cl.⁶ ..................................... G02B 6/36
[52] U.S. Cl. ................. 385/137; 385/89; 385/92
[58] Field of Search ................. 385/69, 86, 87, 385/136, 137, 62, 81, 59, 88–94

[56] References Cited

U.S. PATENT DOCUMENTS

| | | |
|---|---|---|
| 3,572,891 | 3/1971 | Longenecker ............... 350/96 |
| 5,231,685 | 7/1993 | Hanzawa ..................... 385/84 |
| 5,450,514 | 9/1995 | Hotea et al. ................. 387/87 |
| 5,530,785 | 6/1996 | Sakamoto et al. ........... 385/87 |

*Primary Examiner*—Hung N. Ngo
*Attorney, Agent, or Firm*—Robert W.J. Usher

[57] ABSTRACT

Within a ferrule inserting hole 21 of a housing 2, a stop groove 23 is provided, while a taper portion 24 is formed as an insertion stopper. A ferrule 3 inserted and held in the housing 2 comprises a substantially cylindrical optical-fiber holding section 31, an optical-fiber crimping section 32 adapted to be crimped by means of a crimping tool for connecting electric wires or the like, and a latch 33 which expands within the stop groove 23 when positioned therein so as to prevent the ferrule 3 from dropping out. Accordingly, a crimping tool used for electric contacts in typical electric works can be used for crimping and attaching an optical fiber 4 to the ferrule 3. The ferrule 3 having the optical fiber 4 attached thereto can be firmly held by the housing 2 by simply inserting therein.

8 Claims, 4 Drawing Sheets

Fig. 3
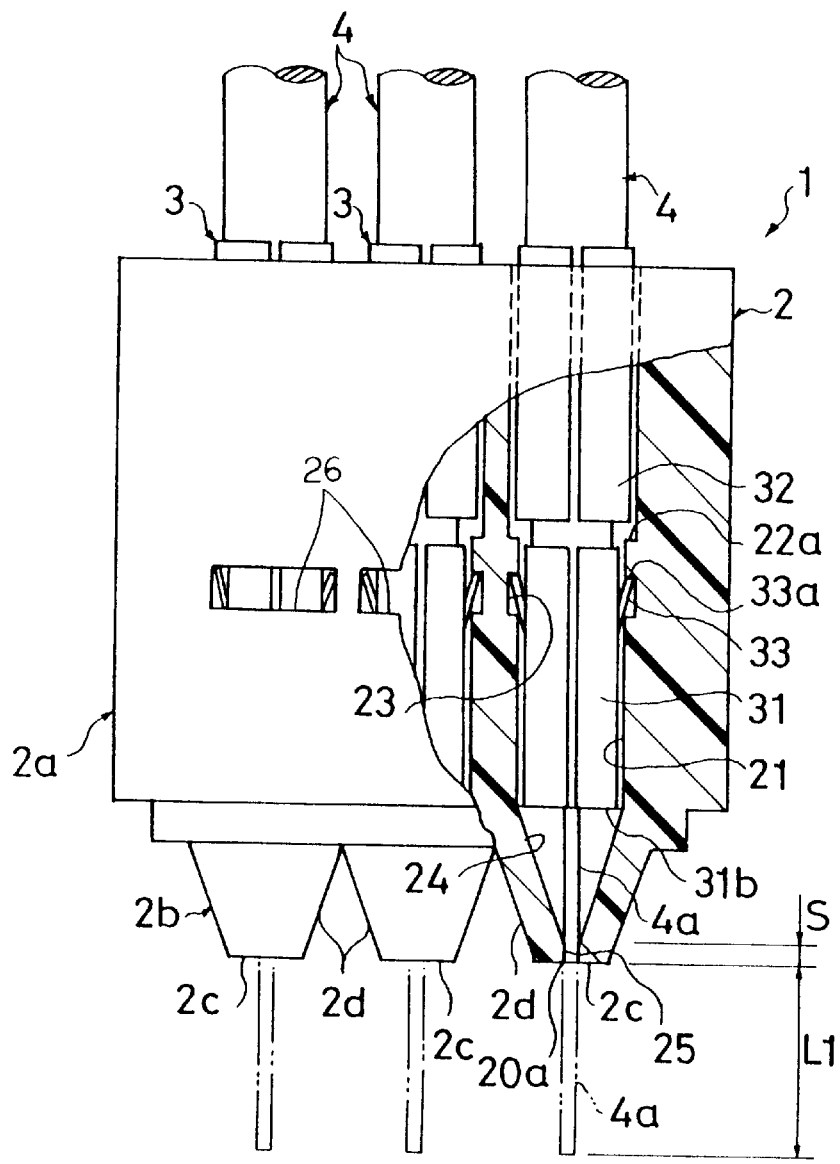
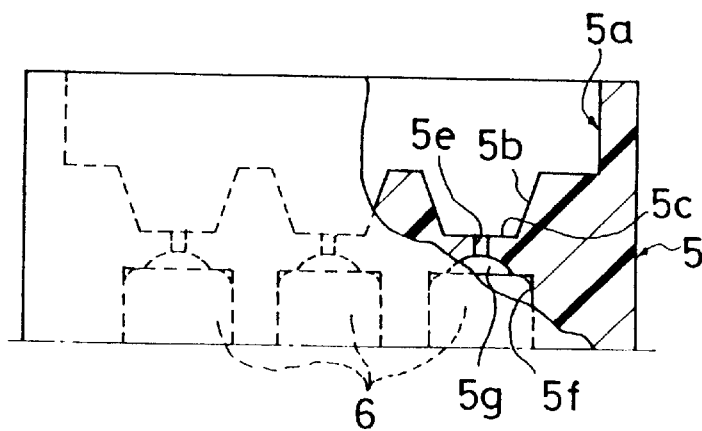

CONNECTOR FOR OPTICAL FIBER

RELATED APPLICATIONS

This application claims the priority of Japanese Patent Application No. 8-133826 filed on May 28, 1996, which is incorporated herein by reference.

FIELD OF THE INVENTION

The present invention relates to a connector for optical fiber used for connecting a light emitting element or light receiving element to an optical fiber or connecting optical fibers together.

BACKGROUND OF THE INVENTION

An example of a connector for optical fiber used as a data transmission medium is configured to utilize a plug comprising a contact for optical fiber known as a ferrule in which an end portion of an optical fiber to be connected is inserted and held in place, via a coupling nut covering the outer periphery of the ferrule, a spring for urging the ferrule in a predetermined direction against the coupling nut, and a C ring for holding the ferrule by the coupling nut in a state where the ferrule is urged in the predetermined direction.

In thus configured plug, an optical fiber stripped of its casing is inserted into the ferrule and then secured thereto, bonded by an adhesive, engaged therewith by means of a specific engaging metal part configured so as not to damage the optical fiber, or crimped therewith by means of a caulking tool (crimping tool).

Though a two-component adhesive is often used as the adhesive for bonding the optical fiber to the ferrule, such an adhesive is disadvantageous in that the bonding operation may not rapidly be effected since it takes time for metering each component of the adhesive, managing the curing time, and managing tools. The specific engaging metal part, on the other hand, is expensive, thereby increasing the total cost of the connector. When the ferrule is to be crimped, the crimping tool becomes expensive since it must be manufactured so as to correspond to the form of the ferrule or the like, thereby increasing the manufacturing cost of the connector.

SUMMARY OF THE INVENTION

In view of the aforementioned problems, the objective the present invention is to provide a connector for optical fiber which can be manufactured inexpensively so that optical fibers can quickly be attached.

In order to achieve the above-mentioned object, the connector for optical fiber in accordance with the present invention comprises a housing which has a contact holding hole penetrating therethrough from rear side to front side is adapted to fit with another housing at the front side thereof; and a contact for optical fiber which, while crimping and holding an optical fiber, is inserted into and held within the contact holding hole from the rear side toward front side of the housing.

The housing has a stop groove concentrically formed with the contact holding hole, with an inner diameter greater than that of the contact hole, and an insertion stopper for restricting contact for optical fiber at a predetermined position as to prevent further insertion into the contact holding hole. Also, the contact for optical fiber is constituted by an optical-fiber holding section which has a substantially cylindrical form adapted to receive and hold the optical fiber, an optical-fiber crimping section integrally and continuously formed with a rear portion of the optical-fiber holding section, and a latch formed, so as to project from the optical-fiber holding section toward the periphery.

The optical-fiber crimping section is configured such that the optical fiber held by the optical-fiber holding section can be crimped and held as being crimped therewith by means of a crimping tool for a contact for connecting electric wires. The latch is configured so as to be elastically deformable such that it is positioned within the stop groove when the contact for optical fiber is inserted to the predetermined position, thereby restricting the contact for optical fiber from dropping out from the housing on the rear side.

In thus configured connector for optical fiber, the optical fiber can be secured to the contact for optical fiber by means of a crimping tool for a contact for connecting electric wires together, which is easily available and inexpensive, whereby the securing operation can easily be performed.

An example of the contact configured as mentioned above is a so-called crimping contact which is widely used for connecting electric wires. Accordingly, a commercially available contact for electric wire may be used as it is when the diameter of the optical fiber and the like is appropriate thereto, whereby the connector for optical fiber can be manufactured at a lower cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given herein below and the accompanying drawings which are given by way of illustration only, and thus are not limitative of the present invention wherein:

FIG. 3 is a partial, cross-sectional view showing a separated state of the above-mentioned connector.

DESCRIPTION OF THE PREFERRED EMBODIMENTS

Figure 1:
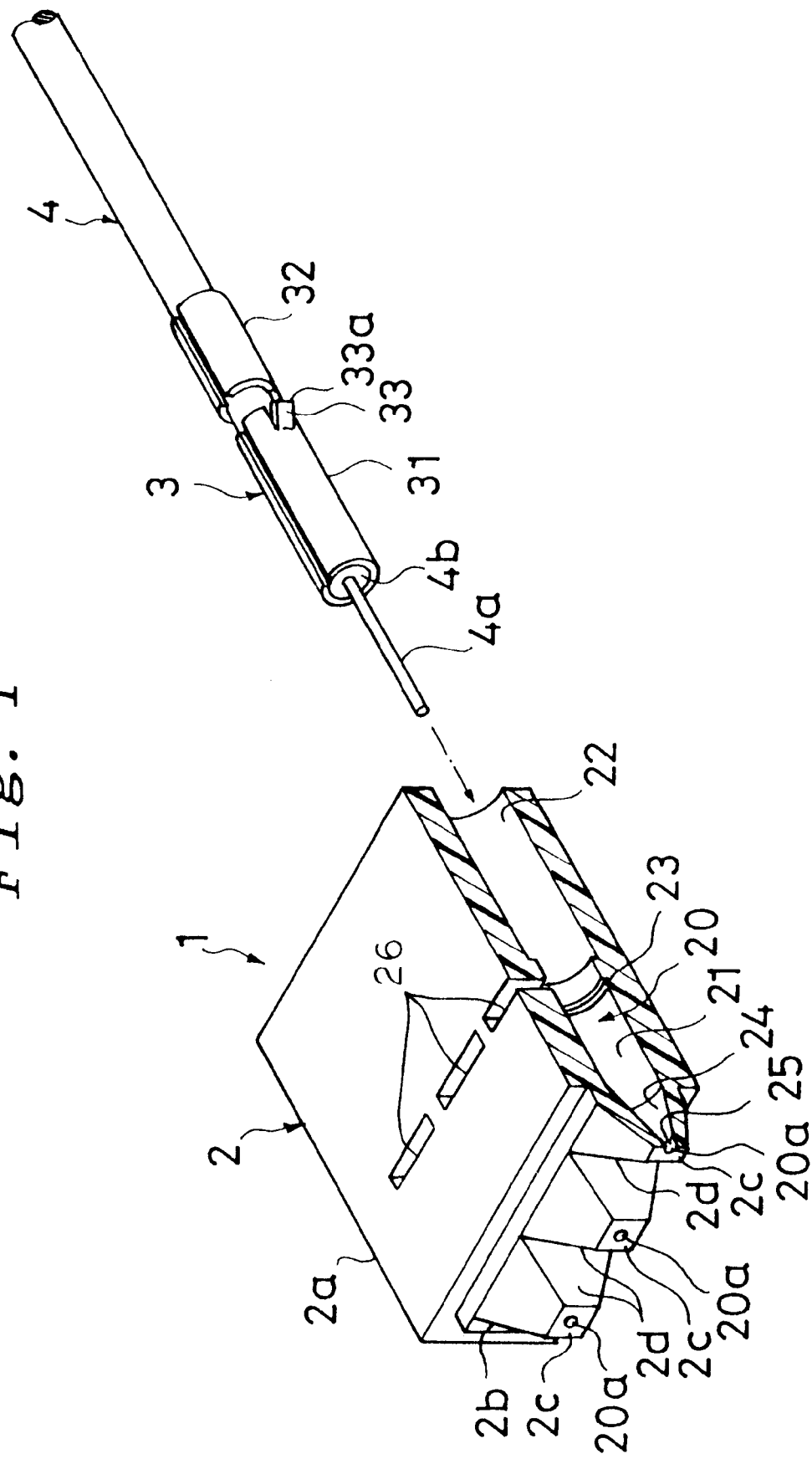
FIG. 1 is a perspective view showing a connector for optical fiber in accordance with the present invention.

In the following, an example of the preferred embodiments of the present invention wherein a three-pole connector is constituted will be explained with reference to accompanying drawings. FIGS. 1 to 4 show an optical connector comprising a plug connector 1, which is a connector for optical fiber in accordance with the present invention, and a receptacle connector 5 fitted to the plug connector 1. This optical connector is used for connecting an optical fiber to a light receiving/emitting element such as a light emitting diode (LED) or photodiode (PD) or complex light receiving/emitting integrated element (referred to simply as "LED" hereinafter for convenience of explanation), including a peripheral circuit, mainly disposed within an instrument.

The plug connector 1 is constituted by a plug housing 2 and a contact for optical fiber (referred to as "ferrule"

hereinafter) ferrule 3. The ferrule 3 crimps and holds an optical fiber 4, while the ferrule 3 crimping and holding the optical fiber 4 is inserted and held in the housing 2.

Figure 2:
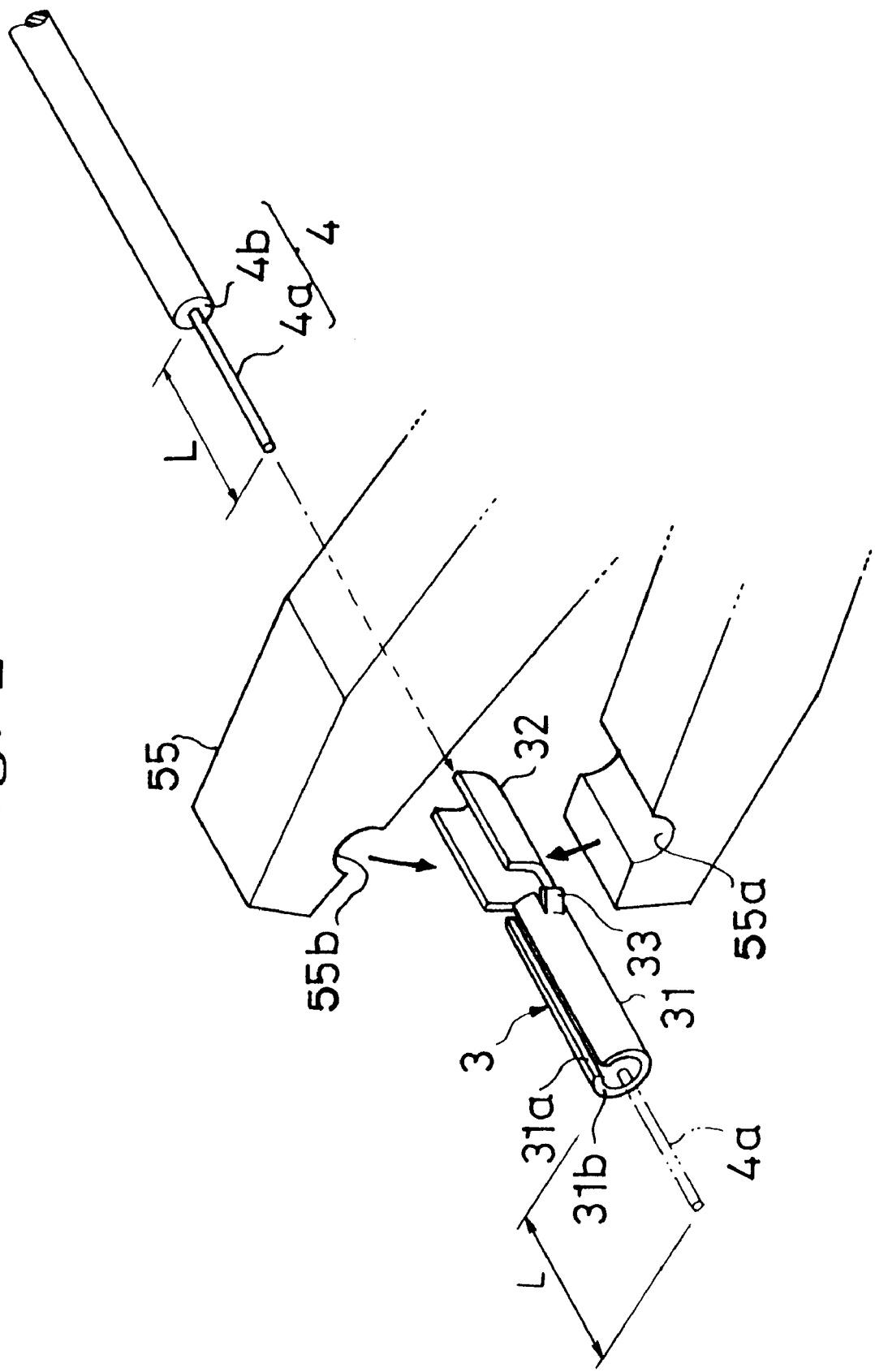
FIG. 2 is a perspective view showing a ferrule and crimping tool used for the above-mentioned connector.

First, the ferrule 3 will be explained with reference to FIG. 2. The ferrule 3, which is formed as an elastic metal sheet is bent, comprises a holding section (optical-fiber holding section) 31 extending in the longitudinal direction with a substantially cylindrical form and a crimping section (optical-fiber crimping section) 32 having a U-shaped cross section with an open upper portion.

Since the holding section 31 is made of a sheet material bent into a cylindrical form, a slit 31a is formed at the upper portion thereof; whereas the side face thereof has a latch 33 with its outer side opening toward the crimping section 32. Here, since the ferrule 3 is made of an elastic material, the slit 31a of the holding section 31 is elastically deformable, and the latch 33 is also elastically deformable.

It is not always necessary for the ferrule 3 to be newly manufactured in order to connect with an optical fiber. For example, known as a female contact in a typical crimping connector for connecting electric wires comprising a cylindrical receiving section into which a male contact is inserted, so as to electrically connect therewith and an electric-wire crimping section having a U-shaped cross section integrally connected to the rear side of the cylindrical receiving section, i.e., having substantially the same shape as the ferrule 3 shown in FIG. 2. Further, a latch is often formed in the receiving section of such a contact on the electric-wire crimping section side. Accordingly, even a contact manufactured for connecting the electric wires may be used as the ferrule 3 in the plug connector 1 as long as it is a female contact which has a receiving section with an inner diameter adapted to receive and hold the optical fiber as well as a crimping section which can crimp and hold the optical fiber.

The optical fiber 4 is crimped and held by thus configured ferrule 3. The optical fiber 4 has a fiber strand (fiber core) 4a at its center for transmitting an optical signal and a coating material (casing or cladding) 4b surrounding the fiber strand 4a. The optical fiber 4 may be secured to the crimping section 32 in a state where the fiber strand 4a is exposed at the tip portion thereof; alternatively, after being secured to the crimping section 32, the casing of the optical fiber 4 protruding from the holding section 31 may be removed.

Namely, the configuration is such that the optical fiber 4, from which the casing 4b has been removed by a length L at its tip portion, protrudes from a front end portion 31b of the holding section 31 when the crimping section 32 is crimped with a crimping tool 55. Here, the length L by which the fiber strand 4a is exposed from the front end portion 31b is set longer than the total length of taper and linear portions 24 and 25 of the plug housing 2 which will be explained later.

The crimping tool 55 is formed like a pair of scissors having U-shaped recesses 55a and 55b at their tip portions. When the crimping section 32 is held by the crimping tool 55 such that the arc-shaped bottom portion and open end portion of the crimping section 32 are respectively positioned at the lower and upper recesses 55a and 55b, the crimping section 32 can be deformed into a substantially circular form so as to crimp and hold the optical fiber 4.

The crimping tool 55 for crimping the crimping section 32 in this manner is not specifically manufactured for crimping the crimping section 32 of the above-mentioned ferrule 3, but a typical crimping tool for electric work used for crimping a male contact in the above-mentioned crimping connector for connecting electric wires or the like.

The ferrule 3 securely attached to the optical fiber 4 is inserted into the plug housing 2 in a state where the fiber strand 4a protrudes therefrom. The plug housing 2 comprises a main section 2a and a fitting section 2b protruding forward from the main section 2a. A ferrule holding hole 20 penetrates through the rear end face of the main section 2a and a front end face 2c of the fitting section 2b.

Since the plug housing 2 in this embodiment is a three-pole plug housing, three ferrule holding holes 20 are formed such that three pieces of ferrule 3 can be inserted into the plug housing 2 from the rear side and held therein. Also, three pieces of fitting protrusions 2d are formed at the fitting section 2b so as to correspond to the respective ferrule holding holes 20. Each fitting protrusion 2d is shaped like a truncated quadrangular pyramid which becomes narrower toward the front end face 2c.

Here, the fitting protrusion 2d may be shaped into a truncated cone or any other truncated polygonal pyramid as long as its front portion is formed narrower so as to be easily positioned with and fitted to the receptacle housing 5, which will be explained later.

The ferrule holding hole 20 is constituted by a tip hole 21 and a base end hole 22, at which the holding section 31 and the crimping section 32 are respectively positioned when the ferrule 3 is inserted therein. The tip hole 21 on the side of the base end hole 22 is provided with a lock groove (stop groove) 23 which has an inner diameter greater than that of the base end hole 22 and is concentrically formed with the latter.

On the tip side of the tip hole 21, the taper portion 24 is formed so as to reduce its inner diameter as it advances forward and form an opening 20a at the end face 2c of the fitting protrusion 2d. This opening 20a is formed at the center of the end face 2c, while having an inner diameter slightly greater than the outer diameter of the fiber strand 4a. Also, in order to linearly hold the fiber strand 4a, the linear portion 25 having a length of S is formed at the tip of the taper portion 24.

With thus formed plug housing 2, ferrule 3, and optical fiber 4, as the ferrule 3 crimping the optical fiber 4 is inserted into the ferrule holding hole 20 from the rear side of the plug housing 2, the rear end portion 33a of the latch 33 abuts to the inner peripheral face of the base end hole 22 and tip hole 21, whereby the latch 33 moves forward while elastically deforming. Then, as shown in FIG. 3, in the state where the front end portion 31b of the holding section 31 is positioned at the taper portion 24, thereby preventing the ferrule 3 from being further inserted therein, the latch 33 elastically recovers so that the rear end portion 33a enters the lock groove 23.

Consequently, the ferrule 3 is prevented from being further pushed forward into the housing 2 and from being pulled out from the rear side (in the direction opposite to the inserting direction). Accordingly, the ferrule 3 is firmly held in a state where the holding section 31 and the crimping section 32 are respectively positioned within the tip hole 21 and the base end hole 22.

In the plug connector 1, the taper portion 24 restricts the ferrule 3 from being further inserted therein, thereby constituting the insertion stopper in the present invention. Accordingly, the state in which the holding section is positioned within the tip hole 21 as the taper portion 24 restrains the ferrule 3 from being inserted therein becomes the predetermined position of the contact for optical fiber (ferrule) with respect to the housing in the present invention.

In the following, the case will be explained where the ferrule 3 held at the predetermined position, as mentioned above, is removed from the housing 2. Bored in the upper face of the housing 2 is a release opening 26 which communicates with the lock groove 23. In order to remove the ferrule 3, a non-depicted, fork-shaped (tuning fork like) removing tool is inserted into the release opening so as to elastically deform the latch 33 inward, thereby releasing the engagement between the latch 33 and the lock groove 23, and then the ferrule 3 is pulled out.

Though the taper portion 24 is formed as the insertion stopper in the above-mentioned plug connector 1; in the case where the outer diameter of the crimping section 32 after crimping the optical fiber 4 is greater than the outer diameter of the holding section 31, the inner diameter of the base end hole 22 may be made greater than that of the tip hole 21, thereby forming, due to the difference between their inner diameters, a shoulder portion 22a which may serve as the insertion stopper.

In this configuration, the ferrule 3 can be held at the predetermined position as the end face of the crimping section 32 on the side of the holding section 31 abutting to the shoulder portion 22a. Accordingly, it becomes unnecessary for the plug housing to be provided with the taper portion 24, whereby the plug housing can be formed with the tip hole opening as it is.

When the ferrule 3 is inserted and held in the aforementioned manner, as the fiber strand 4a protrudes from the end face 2a by a length L1, thus protruding fiber strand 4a is cut so as to be made flush with the end face 2c. The receptacle housing 5 is fitted to the plug housing 2 thus holding the optical fiber 4.

The receptacle housing 5 is bored with an accommodating hole 5a into which the fitting section 2b of the plug housing 2 is inserted. Since the fitting protrusion 2d is shaped into a truncated, quadrangular pyramid or truncated cone, reducing its width toward the tip portion thereof in order to be easily fitted to the receptacle housing 5, a portion (protrusion-receiving portion 5b) of the accommodating hole 5a into which the fitting protrusion 2d is inserted has a recess formed like a truncated quadrangular pyramid or truncated cone corresponding to the fitting protrusion 2d.

A bottom face 5c of the protrusion-receiving portion 5b is bored with a through-hole 5e communicating with an accommodating hole (referred to as "LED-accommodating hole" hereinafter) 5f for a light receiving/emitting element or complex light receiving/emitting integrated element bored in the face opposite to the accommodating hole 5a. In the LED-accommodating hole 5f, an LED 6 is disposed such that its light emitting section or light receiving section faces the through-hole 5e. Here, in FIGS. 3 and 4, the portion of the receptacle housing 5 opposite to the accommodating hole 5a (on the side where the LED is inserted) is omitted.

Figure 4:
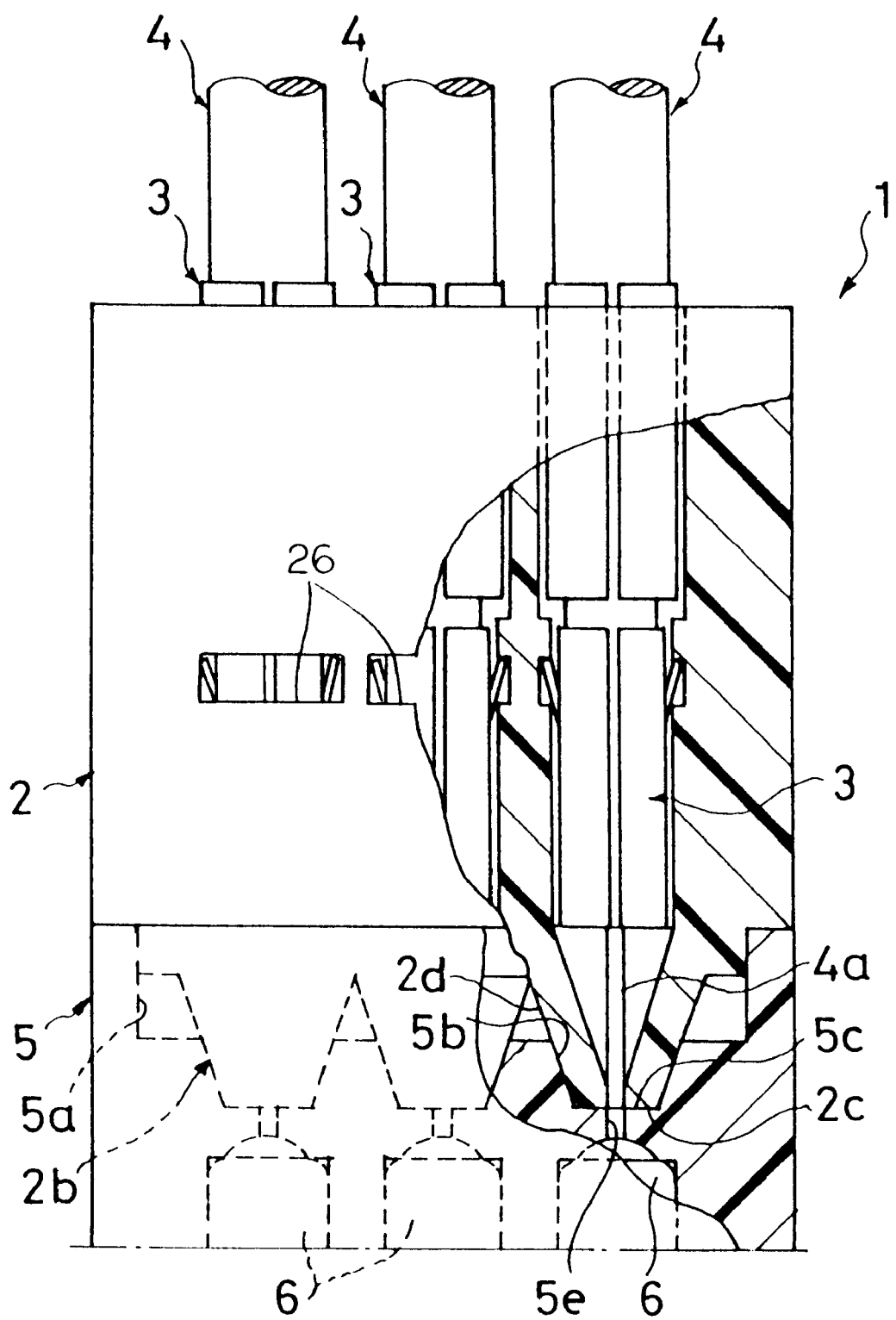
FIG. 4 is a partial, cross-sectional view showing a fitted state of the above-mentioned connector.

The plug housing 2 is inserted and fitted into thus formed receptacle housing 5. Since the fitting protrusion 2d corresponding to the form of the protrusion-receiving section 5b is inserted into the latter, as shown in FIG. 4, both housings 2 and 5 fit together without moving.

In such a state where both housings 2 and 5 fit together, the protrusion-receiving portion 5b and the fitting protrusion 2b are in close contact with each other, the end face 2c and the bottom face 5c are in close contact with each other, and the opening 20a and the through-hole 5e are positioned on the same center axis. Accordingly, light can efficiently be exchanged between the LED 6 disposed within the receptacle housing 5 and the optical fiber 4.

Here, since some light receiving/emitting elements or complex light receiving/emitting integrated elements have a light receiving/emitting surface which is protruded like a convex lens, the accommodating hole 5f has an inside portion 5g (on the side of the through-hole 5e) having a hemispherical or trapezoidal form.

Though the foregoing connector 1 exemplifies the case where it is formed as a connector for connecting an optical fiber to a light receiving/emitting element or complex light receiving/emitting integrated element such as LED or PD, without being restricted to such a connection, the present invention can be used as a connector for connecting optical fibers together.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A connector for optical fiber comprising a housing which has at least one ferrule holding hole penetrating from a rear side to a front side thereof and which is formed at a front side thereof with one of a male and female mating face for mating engagement with a complementary mating face of another housing of a mating connector; and at least one ferrule for an optical fiber which, while holding and crimping an end of an optical fiber, is inserted end first into and held within said ferrule holding passageway from the front side toward the rear side of said housing;

said at least one ferrule being formed in one piece and comprising:
  an optical-fiber holding section for receiving and holding in terminating relation said end of said optical fiber positioned axially therein, said optical-fiber holding section having a substantially cylindrical form; and
  an optical fiber crimping section integrally and continuously formed with a rear portion of said optical-fiber holding section to extend axially therefrom while having a U-shaped form with an open upper portion, said optical-fiber crimping section crimping and holding said optical fiber held while being crimped and permanently deformed by means of a crimping tool in a state where the optical fiber received and held by said optical fiber holding section is received in said optical-fiber crimping section from said open upper portion, said optical fiber crimping section being made of a metal material.

2. A connector for optical fiber according to claim 1, wherein an insertion stopper is formed within said ferrule holding passageway, said insertion stopper being adapted to abut to said ferrule, inserted into said ferrule holding passageway, so as to determine the inserting position thereof.

3. A connector for optical fiber according to claim 2, wherein said optical-fiber holding section further comprises a latch which projects toward an outer periphery thereof while being elastically deformable toward an inner periphery thereof, whereas a stop groove extending toward the outer periphery is formed within said ferrule holding groove; and
  wherein, when said ferrule for optical fiber is inserted into said ferrule holding passageway, said latch is inserted into said ferrule holding groove in a state where said latch abuts to an inner peripheral face of said ferrule holding passageway and is elastically deformed toward the inner periphery and, when said ferrule for optical fiber is inserted to the position where said ferrule for optical fiber abuts to said insertion stopper, said latch is positioned within said stop groove so as to be released from elastic deformation and expand toward the outer periphery, thereby preventing said ferrule for optical fiber from dropping out.

4. A connector for optical fiber according to claim 3, wherein said housing has a release opening communicating with said holder groove from the outer face thereof, such that a release tool can be inserted into said release opening, so as to elastically deform toward the inner periphery, said latch expanded within said stop groove, allowing said ferrule for optical fiber to be pulled out from said ferrule holding passageway.

5. A connector for optical fiber according to claim 1, wherein said ferrule for optical fiber being constituted by a contact for connecting electric wires, said contact comprising a hollow cylindrical female contact section and a crimping section, said crimping section being integrally connected to said female contact portion and having an upward, U-shaped opening.

6. An optical fiber connector comprising a one-piece housing having a front, mating face and a rear, optical fiber receiving face, a plurality of passageways extending between and opening to the front and the rear faces, the front, mating face having one of a male and female mating configuration for mating engagement with a mating face of complementary mating configuration of a housing of a mating connector, each passageway being formed with optical fiber insertion stop means and an optical fiber retention recess;

a plurality of optical fibers, each having a leading end portion terminated by a one-piece, metal crimping ferrule comprising a front, cylindrical optical fiber holding section axially aligned with a rear U-shaped crimping section, the optical fiber having been terminated by crimping the rear crimping section thereon while the leading end portion is axially received in the holding section;

the crimping ferrule being formed with at least one resilient locking lance diverging rearwardly therefrom;

terminated optical fibers being mounted in respective passageways by insertion of their leading end portions into the rear face and forward along the passageways, with respective optical fiber insertion stop means arresting forward movement of respective terminated optical fibers along the passageways so that leading end portions are adjacent the front face of the housing and respective locking lances resiling into locking engagement with respective recesses thereby preventing withdrawal of the optical fibers from the passageways.

7. An optical fiber connector according to claim 6 wherein release openings are formed through a lateral face of the housing in communication with respective recesses through which release openings a release tool can be inserted into engagement with the respective locking lances to deform them out from locking engagement with their respective locking recesses to permit withdrawal of the terminated optical from the housing via the rear face.

8. An optical fiber connector according to claim 6 wherein the front mating face of the housing has a male mating configuration comprising a plurality of protuberances penetrated by forwardly tapering axial end portions of respective passageways, which tapering portions provide the insertion stop means and receive a tip of a stripped core of the optical fiber.

* * * * *